(12) United States Patent
Graves

(10) Patent No.: US 7,490,803 B1
(45) Date of Patent: Feb. 17, 2009

(54) CURTAIN ROD HAVING INTEGRATED BRACKET ASSEMBLY

(75) Inventor: Brian Graves, San Diego, CA (US)

(73) Assignee: Beme International LLC, San Diego, CA (US)

( * ) Notice: Subject to any disclaimer, the term of this patent is extended or adjusted under 35 U.S.C. 154(b) by 0 days.

(21) Appl. No.: 11/744,765

(22) Filed: May 4, 2007

Related U.S. Application Data

(60) Provisional application No. 60/798,111, filed on May 4, 2006.

(51) Int. Cl.
*A47H 1/14* (2006.01)

(52) U.S. Cl. ............... 248/251; 248/221.12; 248/224.8; 248/222.41; 248/200.1; 211/16; 211/88.04; 211/119.009; 211/105.1; 211/123; 160/330; 403/283; 403/284; 403/285; 403/286; 403/287; 403/288; 403/289; 403/290; 403/291; 403/292; 403/293; 403/294; 403/295; 403/353; 403/360

(58) Field of Classification Search ............... 248/200.1, 248/251, 221.12, 224.8, 222.41; 211/16, 211/88.04, 119.009, 105.1, 123; 160/330; 403/295, 283, 284, 285, 286, 287, 288, 289, 403/290, 291, 292, 293, 294, 353, 360
See application file for complete search history.

(56) References Cited

U.S. PATENT DOCUMENTS

| | | | | | |
|---|---|---|---|---|---|
| 3,661,272 | A | * | 5/1972 | Di Panni, Jr. | ............ 211/105.1 |
| 5,678,703 | A | * | 10/1997 | Sawyer | ............ 211/105.1 |
| 6,012,692 | A | * | 1/2000 | Meck | ............ 248/251 |
| 6,595,478 | B2 | * | 7/2003 | Lee | ............ 248/262 |
| D492,529 | S | * | 7/2004 | Chen | ............ D6/549 |
| 6,796,442 | B1 | * | 9/2004 | Wu | ............ 211/105.1 |
| D521,294 | S | * | 5/2006 | Ferrer Beltran | ............ D6/546 |
| D529,323 | S | * | 10/2006 | Gilbert | ............ D6/550 |
| 2002/0104946 | A1 | * | 8/2002 | Lai | ............ 248/316.8 |
| 2007/0069091 | A1 | * | 3/2007 | Zimmerman | ............ 248/221.12 |

* cited by examiner

*Primary Examiner*—Amy J. Sterling
*Assistant Examiner*—Nkeisha J Dumas

(57) ABSTRACT

A curtain rod assembly includes one or more support members, such as brackets, that are configured to support a curtain rod from a wall. The support member include a coupler portion that provides a seamless and flush interface between the support member and the rod.

9 Claims, 6 Drawing Sheets

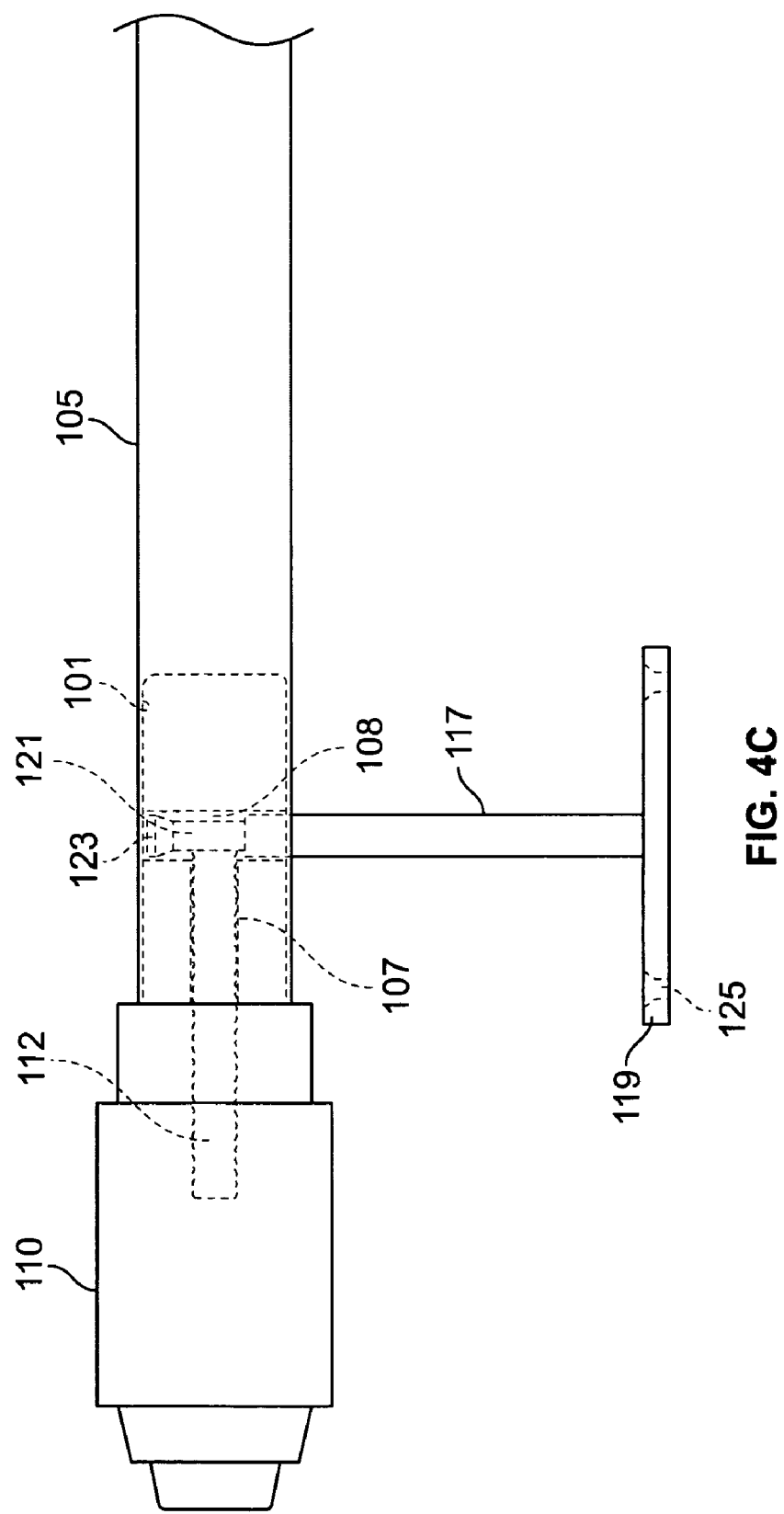

CURTAIN ROD HAVING INTEGRATED BRACKET ASSEMBLY

REFERENCE TO PRIORITY DOCUMENT

This application claims priority of co-pending U.S. Provisional Patent Application Ser. No. 60/798,111 filed May 4, 2006. Priority of the aforementioned filing date is hereby claimed and the disclosure of the Provisional patent application is hereby incorporated by reference in its entirety.

BACKGROUND

Disclosed herein is a curtain rod having an integrated bracket assembly.

A popular form of curtain rod comprises a generally straight rod member. The rod member typically has a plurality of rings that are slidably mounted to support curtains, draperies or the like. In this manner, the rod can support the curtains in a suspended state over a window or other structure.

In order to hang the curtain rod from a wall, one more brackets is typically attached to the rod. The brackets are typically fixed to the wall or woodwork surrounding the window. The plurality of brackets extend outward from the wall and provide, for example, a surface on which the curtain rod rests. The brackets can have various structures. For example, the brackets can be hook shaped such that they receive and support the curtain rod on the wall. The brackets can also be annular or ring-shaped such that the brackets surround the curtain rod. In any event, the brackets are typically visible from the front and contribute to an interrupted appearance of the curtain rod's profile.

SUMMARY

In view of the foregoing, there remains a need for a curtain rod assembly having an integrated supportive bracket providing a seamless profile when viewed from the front.

In one aspect, there is disclosed a curtain rod assembly, comprising: an elongated curtain rod having a first end and a second end, the rod extending along a longitudinal axis; a bracket having a base adapted to be secured to a wall and a shaft that extends outwardly from the base for coupling to the curtain rod, wherein the shaft protrudes into the curtain rod along a direction transverse to the longitudinal axis, the bracket adapted to support the curtain rod from a wall; and a fastener that protrudes into the curtain rod along a direction substantially parallel with the longitudinal axis, wherein a distal end of the fastener engages the shaft of the bracket to retain the shaft within the curtain rod.

In another aspect, there is disclosed a curtain rod assembly, comprising: an elongated curtain rod having a first end and a second end, the rod extending along a longitudinal axis; a bracket adapted be secured to a wall and to support the curtain rod from the wall, the bracket having an elongated portion that couples to the curtain rod, wherein the elongated portion protrudes into the curtain rod along a direction transverse to the longitudinal axis; and a fastener that protrudes into the curtain rod along a direction substantially parallel with the longitudinal axis, wherein a distal end of the fastener engages the shaft of the bracket to retain the shaft within the curtain rod.

Other features and advantages should be apparent from the following description of various embodiments, which illustrate, by way of example, the principles of the invention.

BRIEF DESCRIPTION OF THE DRAWINGS

FIG. 4C shows a top plan view of the curtain rod assembly of FIG. 1 taken along circle C;

DETAILED DESCRIPTION

Figure 1:
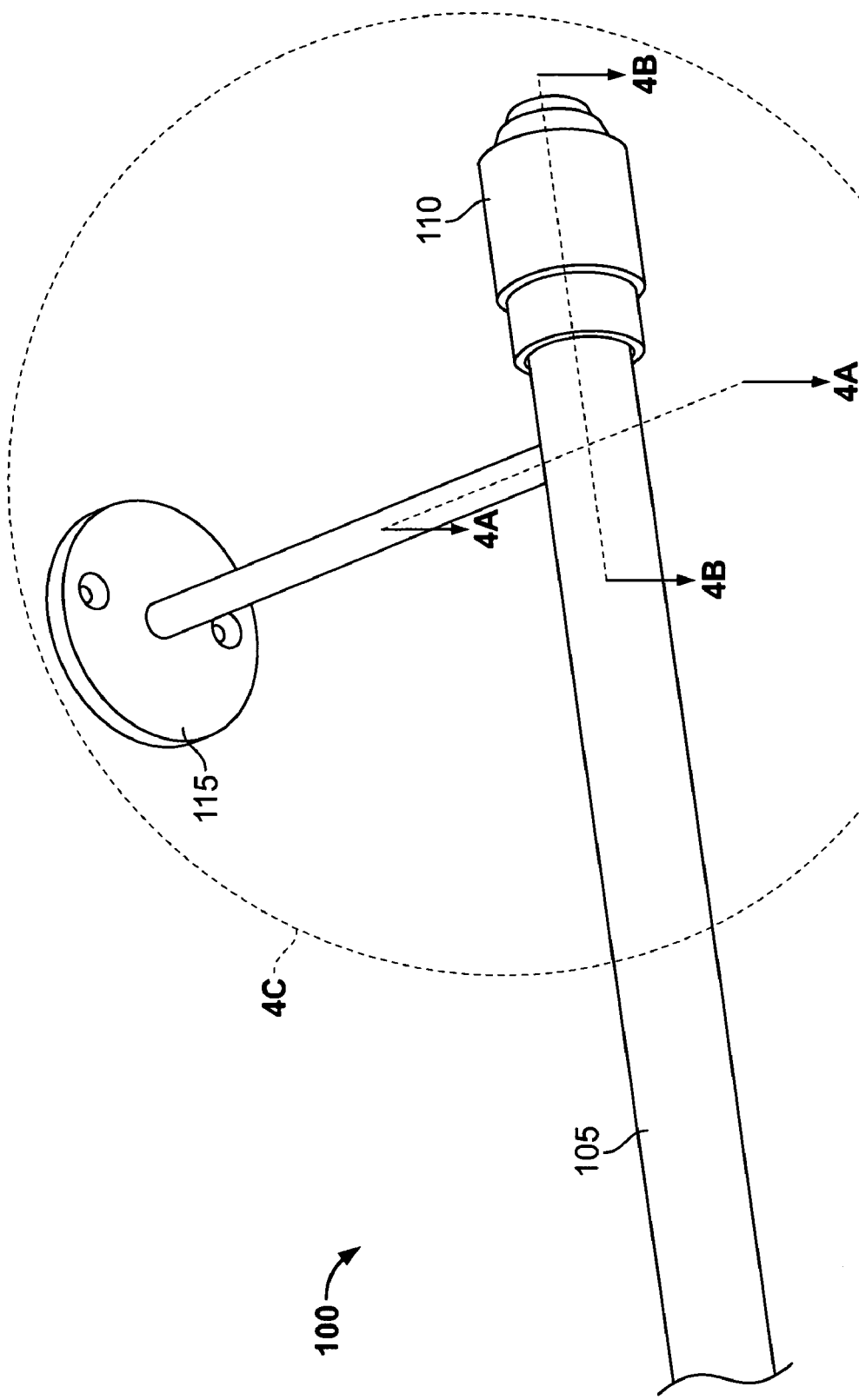
FIG. 1 shows a perspective view of one embodiment of a curtain rod assembly.

FIG. 1 shows a perspective view of one embodiment of a curtain rod assembly 100. Only one end of the curtain rod assembly is shown in the figure, but it should be appreciated that the opposite end of the curtain rod assembly can be a mirror image of what is shown in FIG. 1.

Figure 2:
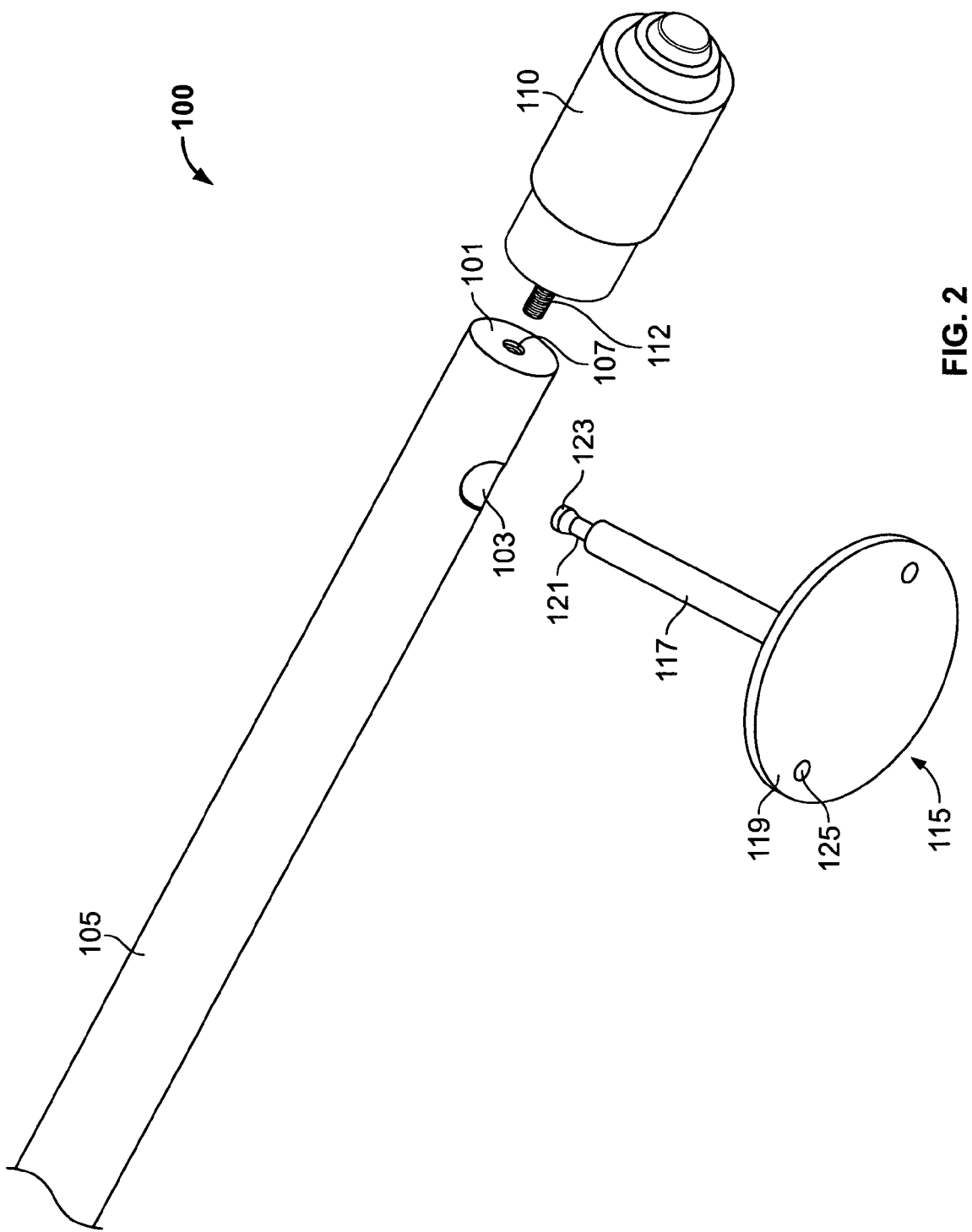
FIG. 2 shows an exploded view of the curtain rod assembly of FIG. 1.

FIG. 2 shows an exploded view of the curtain rod assembly 100 of FIG. 1, which includes a rod 105, an end-piece 110 and a bracket 115. The rod 105 is an elongated member, such as a substantially hollow tube. The rod can be entirely hollow or only partially hollow. The hollow interior of the rod 105 is capped at each end by a connector element 101. The end-piece 110 attaches to the rod 105 at each end by way of the connector element 101. The rod 105 also has an aperture 103 near each of its ends that is in communication with its hollow interior. The bracket 115 inserts through the aperture 103 of the rod 105 and is fixed in place by the end-piece 110 and a fastener 112. This integration of the bracket 115 within the rod 105 by the end-piece 110 and fastener 112 imparts a seamless profile to the curtain rod assembly 100 as described in more detail below.

The end-piece 110, such as a decorative finial, connects to each end of the rod 105 by way of the fastener 112. The end-piece need not be a decorative finial. The fastener 112 can be, for example, a double-ended screw and provides a connection between the end-piece 110 and the rod 105. This connection can be by way of the connector element 101, as described in more detail below. The fastener 112 can be of conventional gauge and thread count known in the art. The fastener 112 can be part of the end-piece 110 as shown in the curtain rod assembly embodiment of FIG. 2 or the fastener 112 can be independent of the end-piece 110.

As described above, the supportive bracket 115 is integrated within the rod 105 by interaction with the end-piece 110 and fastener 112. This can impart a visually seamless profile to the curtain rod assembly 100 such that the bracket 115 appears to be an integral piece with the rod. The bracket 115 as shown in FIG. 2 includes a wall coupler, such as a flat base 119, and an elongate shaft 117. The base 119 includes one or more holes 125 through which the base 119 of the bracket 115 can be fixedly attached to the wall or woodwork around the window such as by screws, nails and the like. Alternately, the base 118 cab be attached using glue. The elongate shaft 117 extends outwardly away from the base 119 and inserts into the aperture 103 of the rod 105 at its opposite end, to be described in more detail below. The shaft 117 and the aperture 103 are of corresponding diameter and size such that when the shaft 117 is inserted through the aperture 103 there is very little play or movement between the two. This provides for a stable connection between the rod 105 and the bracket 115.

Figure 3A:
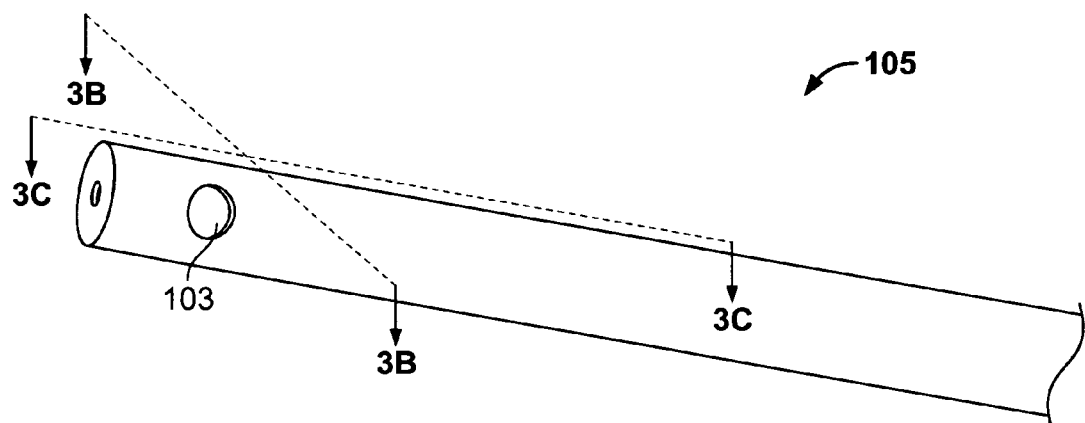
FIG. 3A shows a perspective view of the curtain rod of FIG. 1.
Figure 3B:
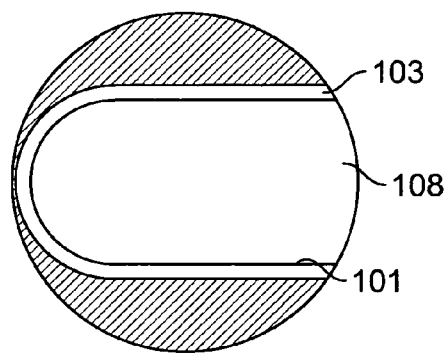
FIGS. 3B and 3C show cross-sectional views of the curtain rod of FIG. 3A taken along lines B-B and C-C, respectively.
Figure 3C:
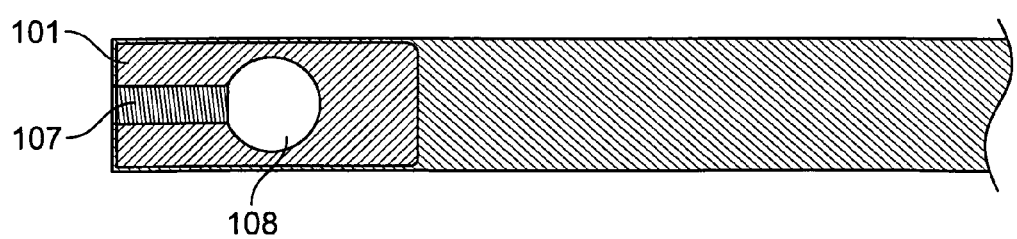

As best shown in FIGS. 3A-3C, the connector element 101 is located inside the hollow interior of the rod 105 at or near each end of the rod 105. The connector element 101 can be fixedly attached to the hollow interior of the rod 105, such as by a weld or similar fixation method. The connector element 101 can also be integrally formed with the rod 105. The connector element 101 has a longitudinal, threaded passage 107, which accommodates the fastener 112, and a transverse passage 108, which aligns with the aperture 103 of the rod 105. As described above, the fastener 112 attaches the endpiece 110 to the rod 105 by way of the connector element 101.

Figure 4A:
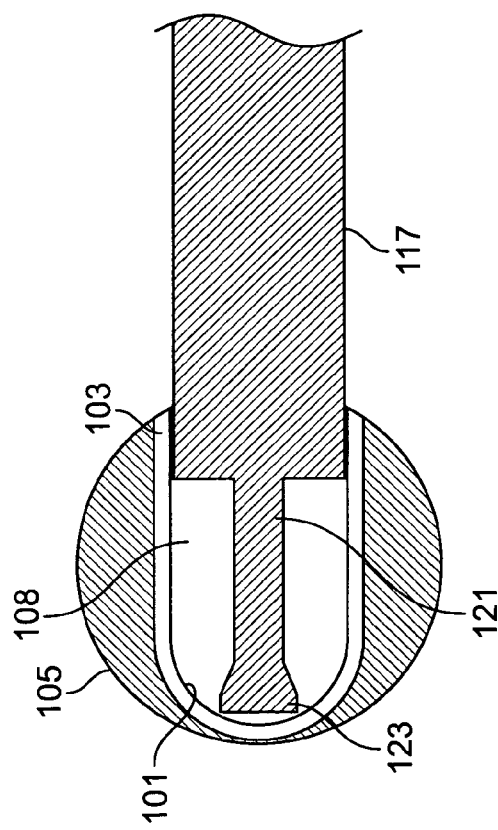
FIG. 4A shows a cross-sectional view of the curtain rod assembly of FIG. 1 taken along lines A-A.
Figure 4B:
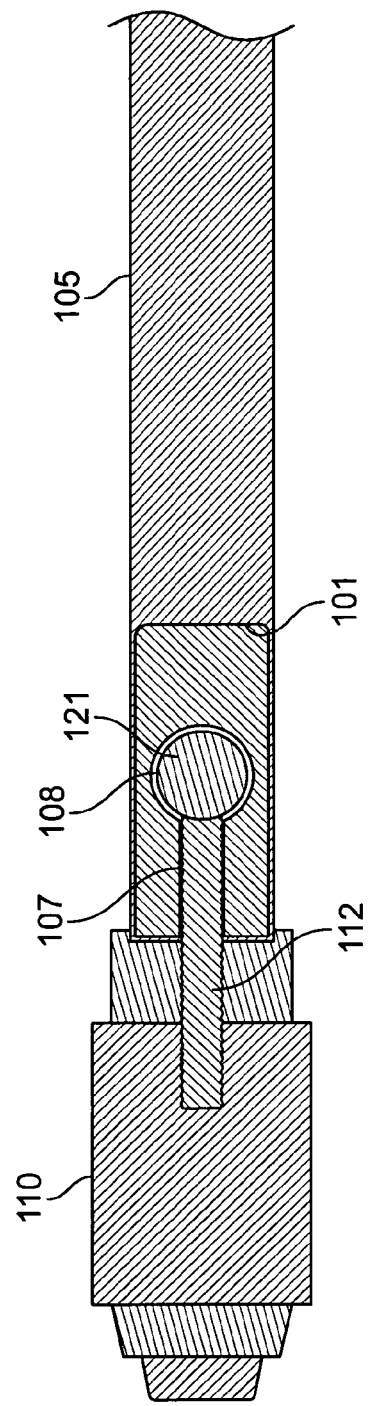
FIG. 4B shows a cross-sectional view of the curtain rod assembly of FIG. 1 taken along lines B-B.

FIGS. 4A, 4B and 4C illustrate one embodiment of the curtain rod assembly 100. The end of the shaft 117 opposite the base 119 of the bracket 115 has a narrowed diameter such that it has the appearance of a pin 121 having a flange 123. This end of the shaft 117 is inserted through the aperture 103 of the rod 105 such that the flange 123 may make contact with the wall of the connector element 101 opposite its entry point at the aperture 103. The pin 121 spans the longitudinal passage 107 of the connector element 101. Further, at least a portion of the shaft 117 is also inside the connector element 101 and thus, within the wall of the rod 105. This gives a smooth, integrated appearance to the intersection of the bracket 115 and the rod 105. The shaft 117 of the bracket 115 is held inside the rod 105 through contact with the fastener 112 as described in more detail below.

The bracket 115 can be retained within the rod 105 in various manners. In the embodiment best shown in FIG. 4C, the shaft 117 is inserted through the aperture 103 and the transverse passage 108 of the connector element 101 until the flange 123 contacts the opposing wall of the connector element 101 and the pin 121 spans the longitudinal passage 107 of the connector element 101. The length of the pin 121 between the flange 123 and the end of the shaft 117 is sized proportionately to receive the diameter of the end of the fastener 112. The fastener 112 is threaded through the longitudinal passage 107 of the connector element 101 and contacts the pin 121 spanning the passage 107. The end of the fastener 112 is contacted on one side by the flange 123 and on the other side by the shaft 117. The sandwiching of the end of the fastener 112 between the flange 123 and the shaft 117 holds the bracket 115 inside the rod 105 and helps to prevent slippage of the bracket 115 out of the rod 105.

Figure 5:
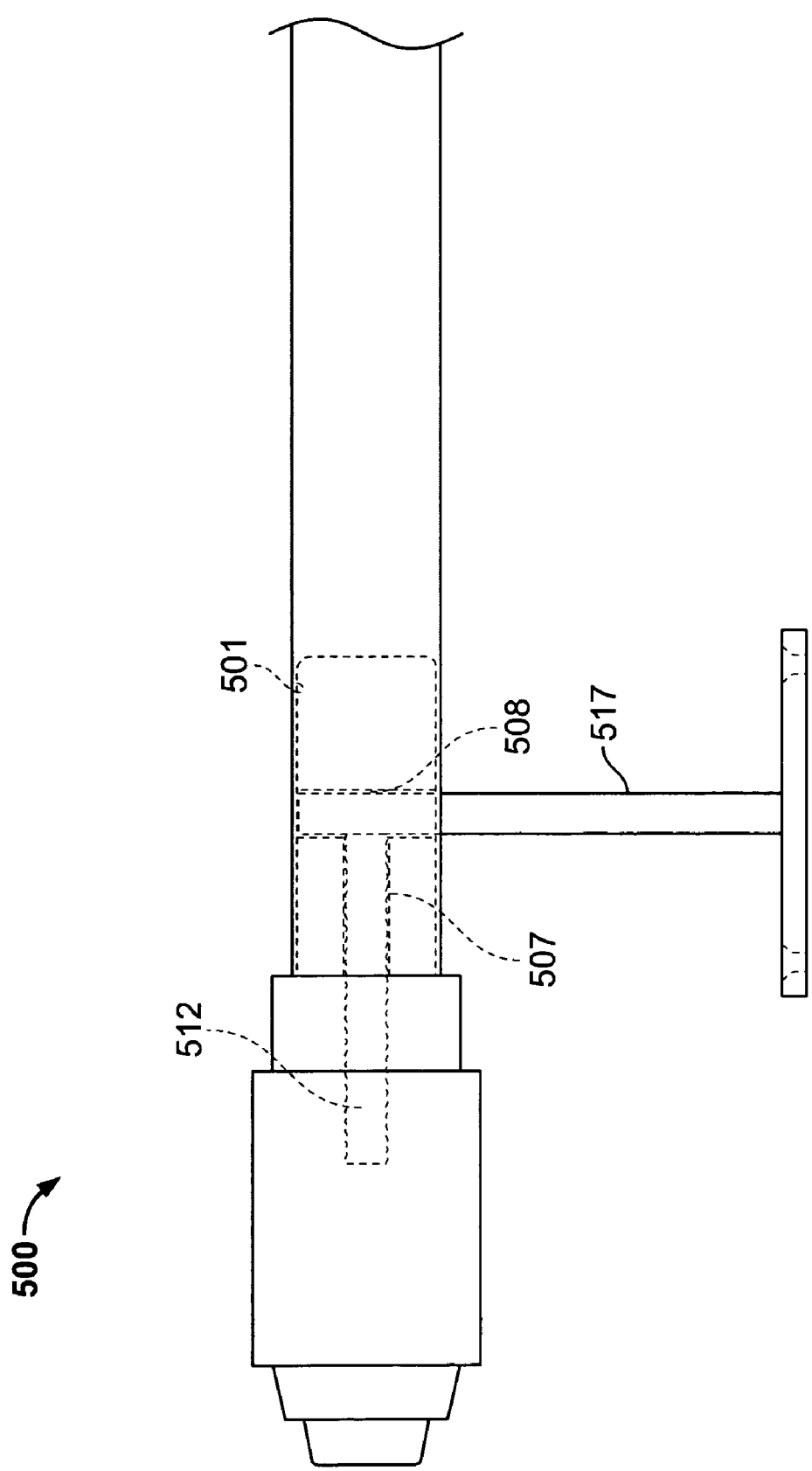
FIG. 5 shows a top plan view of another embodiment of a curtain rod assembly.

FIG. 5 shows another embodiment of the curtain rod assembly 500 including a bracket 115 having a shaft 517 of substantially uniform diameter. As described with respect to the first embodiment, this embodiment includes a connector element 501 that has a longitudinal passage 507, which accommodates the fastener 512, and a transverse passage 508, which aligns to accommodate the shaft 517. The shaft 517 is inserted through the transverse passage 508 of the connector element 501 until the end of the shaft 517 contacts the opposing wall of the connector element 501. In contrast to the first embodiment, the shaft 517 of this embodiment is substantially uniform in diameter along its entire length and does not include a flange. The end of the shaft 517 is held inside the rod 505 by virtue of the threaded fastener 512 contacting the end of the shaft 517.

Generally, each component of the curtain rod assembly can be manufactured from metal stock, but they can also be of other materials such as plastic or wood. The surface of the components can be provided with a protective paint surface. The components generally are constructed of matching materials and finished in matching surfaces to provide them with a uniform appearance. However, the materials and finishing of the components need not be identical.

It should be understood by those skilled in the art that the particular embodiments of the curtain rod assembly presented herein are by way of illustration only, and are meant to be in no way restrictive; therefore, numerous changes and modifications may be made, and the full use of equivalents resorted to, without departing from the spirit or scope of the invention as outlined in the appended claims.

What is claimed is:

1. A curtain rod assembly, comprising:
   an elongated curtain rod having a first end and a second end, the rod extending along a longitudinal axis;
   an insert member positioned inside the curtain rod, the insert having a longitudinal passage parallel to the longitudinal axis of the rod and also having a transverse passage transverse to the longitudinal axis of the rod;
   a bracket having a base adapted to be secured to a wall and a shaft that extends outwardly from the base for coupling to the curtain rod, wherein the shaft protrudes into the curtain rod and through the transverse passage of the insert member inside the curtain rod along a direction transverse to the longitudinal axis, the bracket adapted to support the curtain rod from a wall; and
   a fastener that protrudes into the curtain rod and through the longitudinal passage of the insert member inside the curtain rod along a direction substantially parallel with the longitudinal axis, wherein a distal end of the fastener engages the shaft of the bracket to retain the shaft within the curtain rod.

2. A curtain rod assembly as in claim 1, wherein a proximal end of the fastener is attached to an end-piece positioned on the first end of the curtain rod.

3. A curtain rod assembly as in claim 1, wherein the endpiece is a decorative finial.

4. A curtain rod assembly as in claim 1, wherein the fastener comprises a threaded shank.

5. A curtain rod assembly as in claim 1, wherein the fastener extends into an interior portion of the curtain rod.

6. A curtain rod assembly, comprising:
   an elongated curtain rod having a first end and a second end, the rod extending along a longitudinal axis;
   an insert member positioned inside the curtain rod, the insert having a longitudinal passage parallel to the longitudinal axis of the rod and also having a transverse passage transverse to the longitudinal axis of the rod;
   a bracket adapted be secured to a wall and to support the curtain rod from the wall, the bracket having an elongated portion that couples to the curtain rod, wherein the elongated portion protrudes into the curtain rod and through the transverse passage of the insert member inside the curtain rod along a direction transverse to the longitudinal axis; and a fastener that protrudes into the curtain rod and through the longitudinal passage of the insert member inside the curtain rod along a direction substantially parallel with the longitudinal axis, wherein a distal end of the fastener engages the shaft of the bracket to retain the shaft within the curtain rod.

7. A curtain rod assembly as in claim 6, wherein the fastener extends into an interior portion of the curtain rod.

8. A curtain rod assembly as in claim 6, wherein the endpiece is a decorative finial.

9. A curtain rod assembly as in claim 6, wherein the fastener comprises a threaded shank.

* * * * *